(12) United States Patent
Lee

(10) Patent No.: US 6,711,897 B2
(45) Date of Patent: Mar. 30, 2004

(54) INSTALLATION OF POWER GENERATION BY OCEAN WAVE

(76) Inventor: Wai Fong Lee, 5/F., 197 Ma Tau Wai Road, To Kwa Wan, Kowloon, Hong Kong (CN)

( * ) Notice: Subject to any disclaimer, the term of this patent is extended or adjusted under 35 U.S.C. 154(b) by 0 days.

(21) Appl. No.: 10/235,208

(22) Filed: Sep. 4, 2002

(65) Prior Publication Data

US 2003/0110767 A1 Jun. 19, 2003

(30) Foreign Application Priority Data

Dec. 19, 2001 (HK) .......................................... 01108881

(51) Int. Cl.[7] ................................................. F03C 1/00
(52) U.S. Cl. ........................................... 60/507; 60/496
(58) Field of Search ........................... 60/495, 496, 507

(56) References Cited

U.S. PATENT DOCUMENTS 3,965,365 A * 6/1976 Parr ............................ 290/53
4,359,868 A   11/1982 Slonim ........................ 60/501
4,392,060 A * 7/1983 Ivy ............................. 290/53
4,627,240 A * 12/1986 Holmes ....................... 60/507
5,424,582 A * 6/1995 Trepl et al. .................. 290/53

FOREIGN PATENT DOCUMENTS

CN  1090910 A  8/1994
DE  4143011    4/1993

* cited by examiner

Primary Examiner—Hoang Nguyen
(74) Attorney, Agent, or Firm—Jenkens & Gilchrist, P.C.

(57) ABSTRACT

An installation to apply ocean energy to power generation. The installation includes a floater, lever, chain, ratchet wheel, flywheel, generator, cable, etc. The floater and weight fixed to the floater move up and down with the motion of wave and drive the strength enlargement mechanism made up of a number of levers to travel alternately and pull the heavy flywheel to rotate constantly. The rotation of the flywheel enables the generator to run and yield electricity. The installation has simple structure and high efficiency and can easily increase or decrease the enlargement mechanism according to the capacity of generation. This installation with low cost can be widely utilized for pollution-free power generation in the coast.

3 Claims, 2 Drawing Sheets

INSTALLATION OF POWER GENERATION BY OCEAN WAVE

BACKGROUND OF THE INVENTION

1. Technical Field of the Invention

The present invention relates to an installation of applying ocean wave to power generation, more particularly to a power transmitting installation utilizing the principle of levers to convert the power of ocean wave into mechanical power, and then convert the mechanical power into electricity.

2. Description of Related Art

Since realizing the application of electricity, various methods have been used to generate electricity. The traditional way of generating electricity through burning mineral fuels brings increasingly serious pollution problems to the modem society; while the nuclear power plants hide non-neglectable danger of nuclear pollution. Thus, generating electricity by wind power and wave power is suggested.

Chinese Patent document CN1090910A discloses an ocean wave power generating means, which utilizes the up and down motion of wave and the floating of sea water to drive a floater up to have potential energy. When the floater falls down showing a free-fall condition, the generator will be activated and yield electricity through a sector-shaped gear, a ratchet wheel and an accelerating gear train.

U.S. Pat. No. 4,359,868 to Slonim ("Slonim") discloses another method of generating energy by ocean wave. Slonim utilizes the up and down floating motion of a floater to drive a water wheel bucket hanging on the floater to rotate undersea. The power of the rotation is then used to activate a generator to yield electricity.

German Patent DE4143011 to Gleich ("Gleich") discloses a device for converting ocean wave energy. The design of the device is mainly on a main body floating on sea, several outward extending arms fixed on balls which follows the ocean waves to move up and down. The extending arm has a compressing rod driven by a connecting rod to move up and down. A middle section of the compressing rod has a one-way rotating shaft driven by a rack gear, while the umbrella-shaped gear wheel at the other end of said one-way rotating shaft drives a generator rotor of the main body to spindle rotate so as to generate electricity. The generated electricity is then transferred to the shore via cables.

The problems associated with the above solutions are that the structure of the generation devices are too complex and efficiency in electromechanical energy conversion is low. Therefore, the cost in utilizing such method and device in ocean energy power generation is too high.

Therefore, there is a need for a simple, efficient and low-cost method of power generation by ocean wave eliminating the defects.

Various deficiencies of the prior art are overcome by embodiments of the present invention. Embodiments of the invention convert wave power into mechanical power to drive a main shaft and a flywheel. The flywheel activates a generator to yield electricity.

The principle of the present invention is to convert wave power into mechanical power to drive a main shaft and a flywheel. The flywheel activates a generator to yield electricity.

In accordance with principles of the invention, an installation of power generation by ocean wave includes a main shaft, a flywheel mounted to the main shaft, a generator driven by the flywheel and at least one strength enlargement mechanisms. The strength enlargement mechanism rotationally drives the main shaft, the flywheel and the generator. The strength enlargement mechanism includes a floater floating up and down on the sea surface, a weight mounted on the floater and a lever having a first end connected to the weight and a second end hinged to a pivot central shaft. The strength enlargement mechanism further includes a ratchet wheel connected to the main shaft and rotates freely in a first direction. The strength enlargement mechanism includes a chain having a first end and a second end, wherein the first end is connected to the lever and a second end is connected to the lever via a tension spring and fixes adjacent to the pivot central shaft such that the chain goes around the ratchet wheel. The ratchet wheel is mounted in a way such that when the floater is pushed upwards by the wave, the second end of the chain is pulled back by the tension spring with the engaged ratchet wheel being rotated in the free rotating first direction. When the floater is pulled downwards by the wave, the first end of the chain is pulled down by the lever and causes the engaged ratchet wheel, the main shaft and the flywheel to rotate in a second direction.

BRIEF DESCRIPTION OF DRAWINGS

Further description is given on the embodiments of the present invention accompanying with the following figures.

DETAILED DESCRIPTION OF THE DRAWINGS

Dams can be built on the shore, and an ocean wave power plant can be built thereon. Or else, mooring stall can be built on the sea surface in shore, and the power generating installation can be built thereon. Accordingly, ocean wave power plant can be built either along the shore or off shore so as to largely and expediently make use of the ocean wave.

Figure 1:
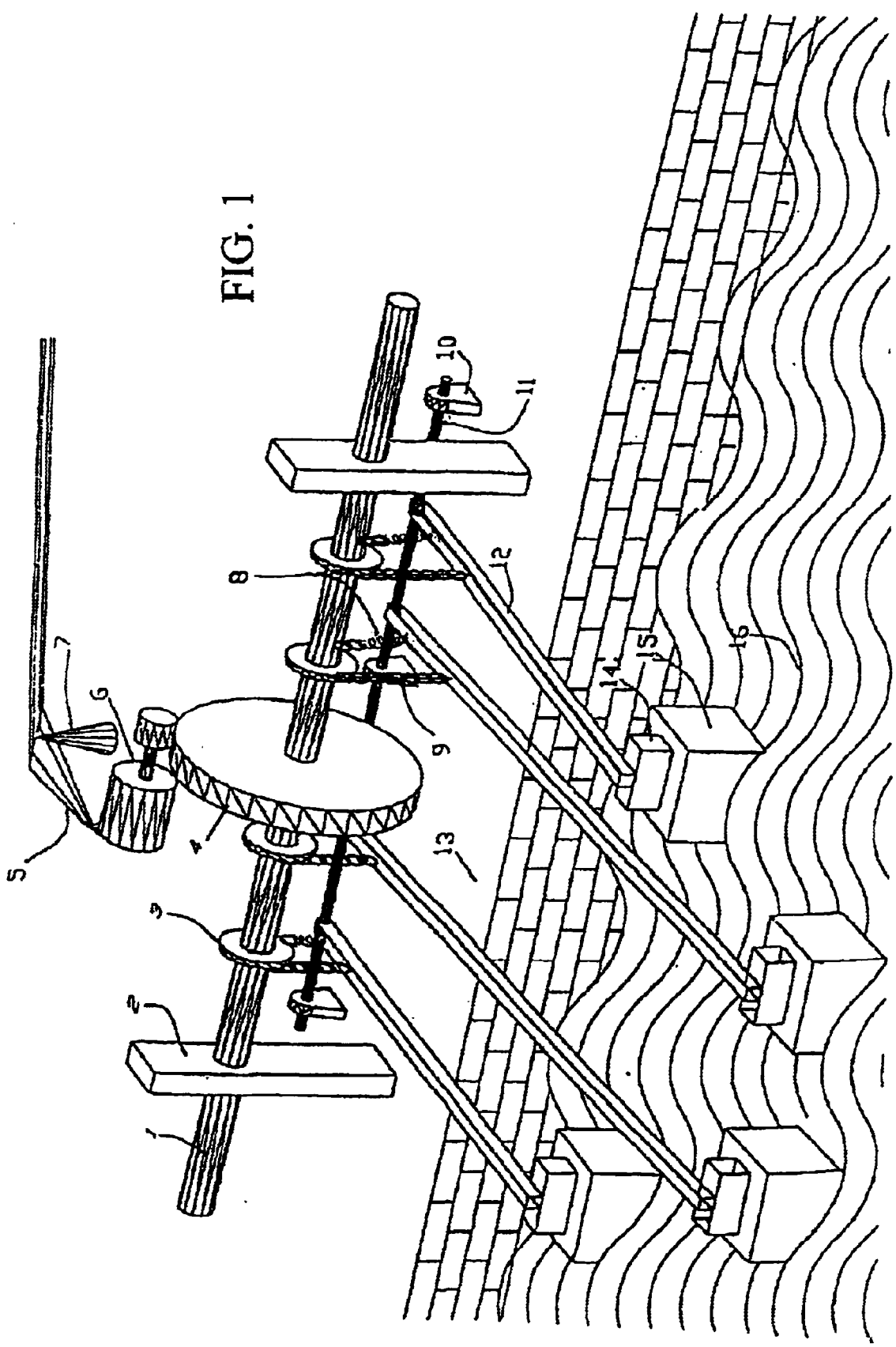
FIG. 1 is a principal view of an ocean-wave power generation means in the present invention.
Figure 2:
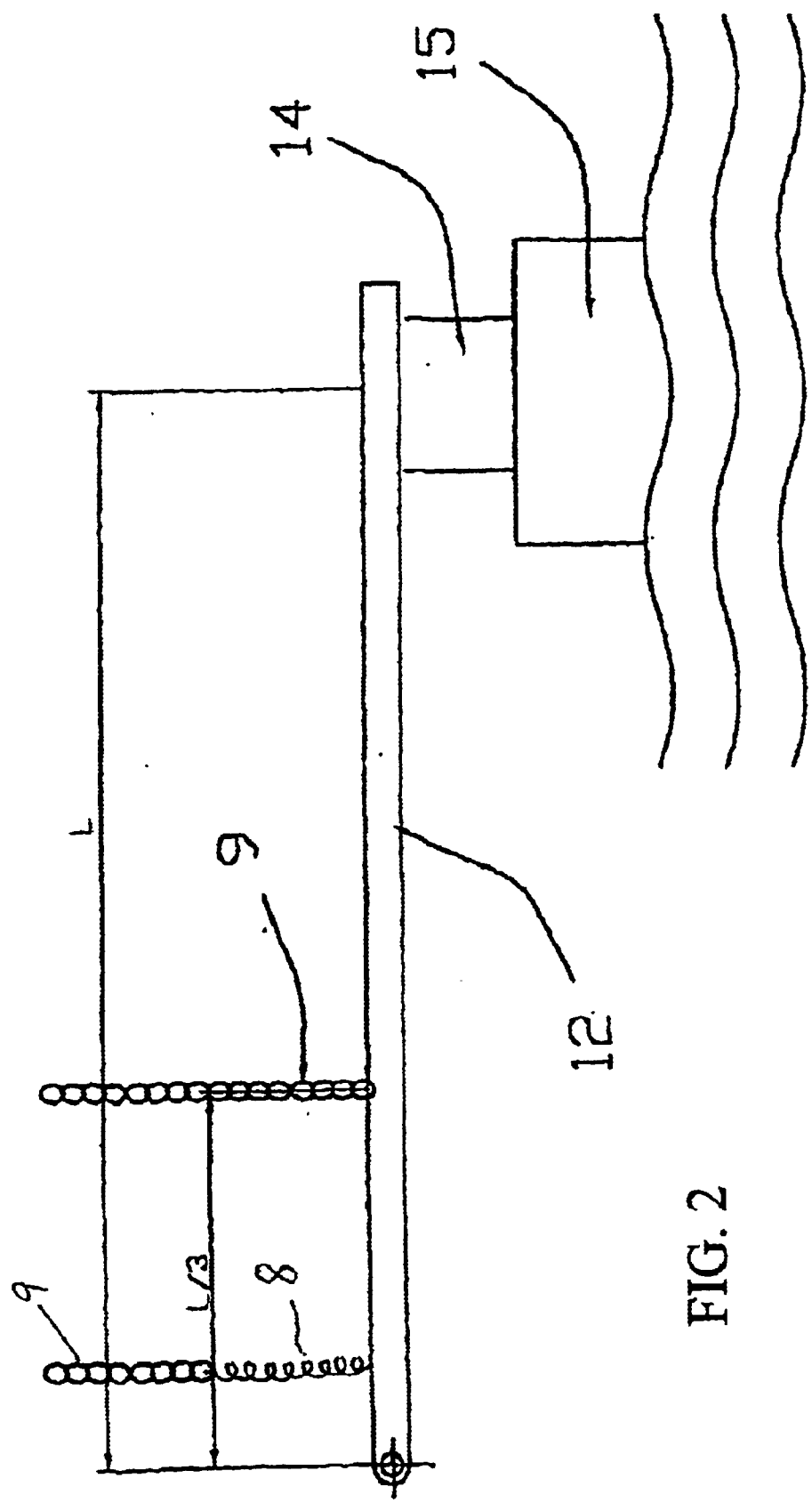
FIG. 2 shows the analysis of force acting by the single lever force of the ocean-wave power generation means in the present invention.

The theory of the power plant is shown in FIGS. 1 and 2. Referring now to FIG. 1, a floater 15 floats up and down in the sea along with the waves. A weight 14 is attached to the end of a lever 12 and also fixed to the surface of the floater 15. The other end of the lever 12 fits through a central shaft 11 as a swinging pivot of the lever 12 moving up and down. The central shaft 11 is fixed on central shaft brackets 10. A chain 9 is attached to the lever 12 about 0.3 times of the lever length away from the lever pivot. The chain 9 goes around a ratchet wheel 3 of a main shaft 1 and the other end of the chain connects to the lever 12 by a spring 8. When the floater 15 is pushed upwards by the wave, the weight 14 and the lever 12 will also be pushed upwards by the floater 15. The chain 9 around the ratchet wheel 3 will be pulled down by the spring 8. Meanwhile as the ratchet wheel 3 moves clockwise, the main shaft 1 and the flywheel 4 will not rotate. When the wave goes down, the floater 15 will also move down. Meanwhile, the weight 14 and the lever 12 will also move down. The chain 9 is pulled down by a falling force of the weight 14 and the lever 12 to drive the ratchet wheel 3, the main shaft 1 and the flywheel 4 to rotate. The main shaft 1 is fixed on main shaft brackets 2 and is installed with a flywheel 4, which engages with a rotor of a generator 6. Therefore, when the ratchet wheel 3 rotates counter-clockwise, it also drives the main shaft 1, the flywheel 4 and the generator 6 to rotate at the same time. Thus, the generator runs and yields electricity, which is then transferred to the customers via cables 5.

The flywheel 4 is a large component part for storing energy. It can be designed as driven by a plurality of levers 12, such as 10 or 20 levers, travelling alternatively to pull the flywheel 4 so as to ensure the flywheel 4 continuously rotate and continuously drive the generator 6 to run and yield electricity.

The floater 15 can include various kinds of materials, such as metals, plastics, or fiber glass. It can also be of any shape as long as it can carry the weight of the weight 14 and the lever 12 with 1/3 or 1/4 of its volume floating above sea level.

Referring now to FIG. 2, according to an exemplary experimental result, it has been found that when the weight 14 and the lever 12 go up and down along with the floater 15, the pulling weight of weight 14 is only about 20% of its original pulling weight. However, the weight 14 can be increased to about 60% of its original pulling weight through the effect of the length proportion of the lever in the aforesaid embodiment.

Suppose the weight of the weight is 10 tons, the floater 15 being pushed up and down by wave in 12 times per minute, the chain 9 will receive 10×60%×12=72 (tons) of pulling force per minute to rotate the flywheel 4. 72 tons is only the pulling force generated by one lever in one minute. If each flywheel is designed as being pulled by 10 levers, then the flywheel 4 will receive 720 tons (10×72 tons) of pulling force per minute. This is a very considerable power.

What is claimed is:

1. An installation for power generation by ocean waves, the installation comprising:

a main shaft;

a flywheel mounted to the main shaft;

a generator driven by the flywheel;

at least one strength enlargement mechanism for rotationally driving the main shaft, the flywheel, and the generator;

wherein each of the at least one strength enlargement mechanism comprises:

a floater floating on a sea surface;

a weight mounted on the floater;

a lever having a first end connected to the weight and a second end hinged to a pivot central shaft;

a ratchet wheel connected to the main shaft and freely rotating in a first direction;

a chain having a first end and a second end;

wherein the first end is connected to the lever and the second end is connected to the lever via a tension spring;

wherein the tension spring fixes adjacent to the pivot central shaft such that the chain goes around the ratchet wheel;

wherein said ratchet wheel is mounted in a way such that when the floater is pushed upwards by the wave, the second end of the chain is pulled back by the tension spring with the engaged ratchet wheel being rotated in the free rotating first direction; and wherein, when the floater is pulled downwards by the wave, the first end of the chain is pulled down by the lever with the engaged ratchet wheel, the main shaft and the flywheel being rotated in a second direction.

2. The installation for power generation by ocean waves of claim 1, wherein the first end of the chain is fixed at the lever at about 0.3 times of the lever length away from the lever pivot.

3. The installation for power generation by ocean waves as in claim 1 or 2, wherein the pivot central shaft is common to each of the at least one strength enlargement mechanism.

* * * * *